(No Model.)
F. HAYES.
DEVICE FOR WASHING KNIVES.
No. 597,411. Patented Jan. 18, 1898.
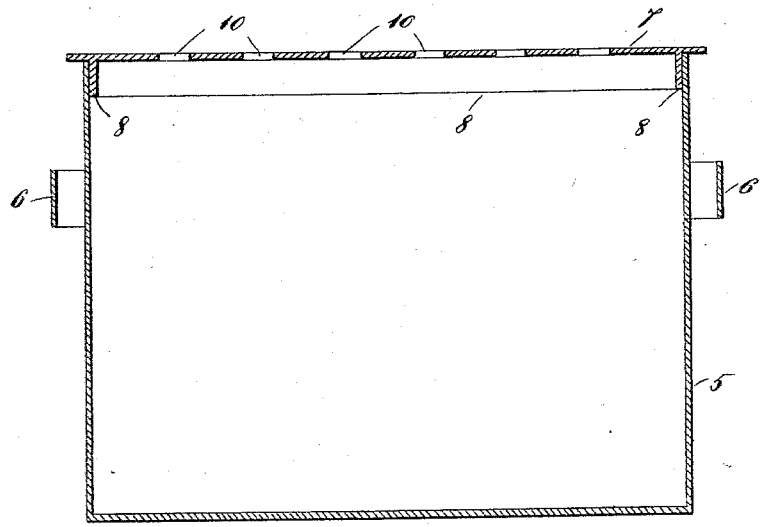
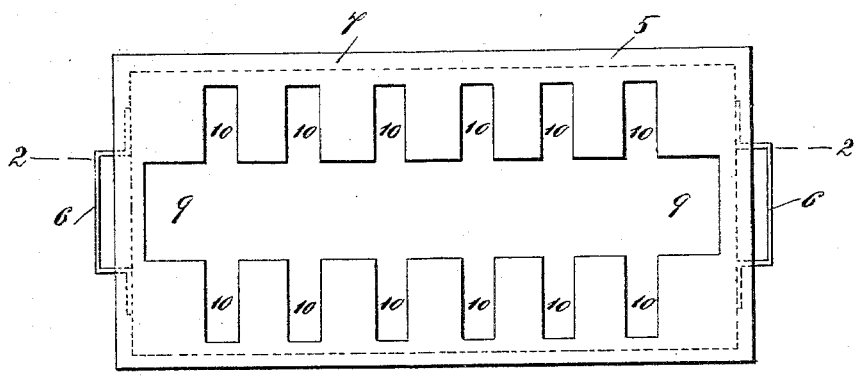
WITNESS
John Buckler
L. M. Muller
INVENTOR
Fanny Hayes,
BY Edgar Tate & Co.
ATTORNEYS

UNITED STATES PATENT OFFICE.

FANNY HAYES, OF COCKINGTON, ENGLAND.

DEVICE FOR WASHING KNIVES.

SPECIFICATION forming part of Letters Patent No. 597,411, dated January 18, 1898.

Application filed July 30, 1897. Serial No. 646,479. (No model.)

*To all whom it may concern:*

Be it known that I, FANNY HAYES, a subject of the Queen of Great Britain, residing at Cockington, in the county of Devon, England, have invented certain new and useful Improvements in Devices for Washing Knives, of which the following is a full and complete specification, such as will enable those skilled in the art to which it appertains to make and use the same.

This invention relates to devices for use in washing table-knives and other knives which are adapted for use in kitchens, dining-rooms, and other and similar places; and the object thereof is to provide an improved device of this class which is designed to prevent the handles of the knives from being immersed in the water.

The invention is fully disclosed in the following specification, of which the accompanying drawings form a part, in which—

Figure 1 is a central longitudinal vertical section of my improvement on the line 2 2 of Fig. 2, and Fig. 2 a plan view thereof.

In the drawings forming part of this specification the separate parts of my improvement are designated by the same numerals of reference in each of the views, and in the practice of my invention I provide an oblong vessel or receptacle 5, which is preferably angular in form, and which is provided at each end with handles 6 and with a detachable cap or cover 7, which is provided on the under surface thereof, at each side, and at each end with downwardly-directed flanges 8, which are designed, preferably, to fit within the top of the vessel or receptacle 5, but which may inclose said top, if desired.

The cover 7 is provided centrally with a longitudinal slot or opening 9, which extends almost the full length thereof, and at each side thereof are formed transverse slots or openings 10, which communicate therewith, and the operation will be readily understood from the foregoing description when taken in connection with the accompanying drawings and the following statement thereof.

In practice the vessel or receptacle 5 is filled with hot water, in which is placed soap or other washing material, and the knives are suspended by means of the handles through the slots 10 in such manner that the blades thereof enter the water. One of the chief objects of this device is to clean the knife-blades by steeping the same in the hot water or allowing the same to remain therein until the grease and other dirt or substances are removed therefrom, and the said knives may be removed from the slots 10 and the blades thereof moved back and forth in the water through the longitudinal slot 9 and then removed and thoroughly wiped and dried.

It will be understood that the handles of the knives project upwardly above the slots 10, and the blades thereof are thus suspended through said slots, and it will thus be seen that I accomplish the object of my invention by means of a device which is simple in construction and operation and perfectly adapted to accomplish the result for which it is intended.

It will also be apparent that changes in and modifications of the construction herein described may be made without departing from the spirit of my invention or sacrificing its advantages.

Having fully described my invention, I claim as new and desire to secure by Letters Patent—

As an improved article of manufacture a knife-washer consisting of a vessel or receptacle open at the top and provided with a removable cover, said cover being provided with a central longitudinal opening and at each side thereof with a plurality of slots or openings which communicate with said central opening, substantially as and for the purpose described.

In testimony that I claim the foregoing as my invention I have signed my name, in presence of the subscribing witnesses, this 20th day of July, 1897.

FANNY HAYES.

Witnesses:
JAMES R. MARLES,
MARY E. HAYS.